US010630767B1

(12) United States Patent
Dhoolam et al.

(10) Patent No.: US 10,630,767 B1
(45) Date of Patent: Apr. 21, 2020

(54) HARDWARE GROUPING BASED COMPUTING RESOURCE ALLOCATION

(71) Applicant: Amazon Technologies, Inc., Seattle, WA (US)

(72) Inventors: Surya Prakash Dhoolam, Seattle, WA (US); Marc John Brooker, Seattle, WA (US); Michael Groenewald, Cape Town (ZA); Christopher Magee Greenwood, Seattle, WA (US); Mark Danoher, Cape Town (ZA); Gabriël de Vos Smit, Cape Town (ZA); Madhuvanesh Parthasarathy, Renton, WA (US); Joshua Dawie Mentz, Cape Town (ZA); Steven J. Kruy, Carnation, WA (US); Marc Levy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 14/502,267

(22) Filed: Sep. 30, 2014

(51) Int. Cl.
*H04L 29/08* (2006.01)
(52) U.S. Cl.
CPC ...... *H04L 67/1008* (2013.01); *H04L 67/1014* (2013.01)
(58) Field of Classification Search
CPC ..... H04L 67/10; H04L 67/1002; H04L 41/08; H04L 29/08549
See application file for complete search history.

(56) References Cited

U.S. PATENT DOCUMENTS

| | | | | |
|---|---|---|---|---|
| 7,447,729 B1* | 11/2008 | Thakur | ............... | G06F 17/30 709/200 |
| 7,480,734 B1* | 1/2009 | Thakur | ............... | H04L 67/1097 709/226 |
| 8,510,429 B1* | 8/2013 | Thakur | ............... | H04L 41/0826 709/219 |
| 9,015,229 B1* | 4/2015 | Raz | ............... | G06F 9/5083 709/203 |
| 2009/0228589 A1* | 9/2009 | Korupolu | ............... | H04L 67/1097 709/226 |
| 2009/0271485 A1* | 10/2009 | Sawyer | ............... | G06F 3/061 709/206 |
| 2011/0185067 A1* | 7/2011 | Finn | ............... | H04L 47/125 709/226 |

(Continued)

*Primary Examiner* — Abdullahi E Salad
*Assistant Examiner* — Robert B McAdams
(74) *Attorney, Agent, or Firm* — Davis Wright Tremaine LLP

(57) ABSTRACT

A customer of a computing resource service provider submits a request to a virtual computer system service to instantiate a virtual computer system. In response to the request, the service obtains physical network information in order to identify any hardware groupings that may be used, at a later time, to provision one or more data storage volumes that may be associated with the virtual computer system. The service assigns a score to each of these hardware groupings based at least in part on the available capacity for provisioning of these data storage volumes. Based at least in part on these assigned scores, the virtual computer system service selects a hardware grouping and instantiates the virtual computer system within the selected hardware grouping.

20 Claims, 8 Drawing Sheets

(56) References Cited

U.S. PATENT DOCUMENTS

| | | | |
|---|---|---|---|
| 2013/0232252 A1* | 9/2013 | Huang | G06F 9/45558 |
| | | | 709/224 |
| 2014/0025770 A1* | 1/2014 | Warfield | G06F 15/17331 |
| | | | 709/213 |
| 2014/0059179 A1* | 2/2014 | Lam | H04N 21/23436 |
| | | | 709/219 |
| 2014/0059228 A1* | 2/2014 | Parikh | G06F 9/5005 |
| | | | 709/226 |
| 2014/0075111 A1* | 3/2014 | Pike | G06F 3/0665 |
| | | | 711/114 |

* cited by examiner

HARDWARE GROUPING BASED COMPUTING RESOURCE ALLOCATION

BACKGROUND

Computing resource service providers and other service providers often may utilize numerous servers, data stores and other resources to enable users to provision a variety of computing resources for use in its operations. In order to reduce the risk of data loss, these service providers may allocate these computing resources in different hardware groupings (e.g., data centers, rooms within data centers, server racks, etc.) to provide data redundancy and ensure availability of these computing resources in the event of a failure of any of these hardware groupings. However, allocation of these computing resources using different hardware groupings may present certain disadvantages. For instance, allocation of computing resources across multiple hardware groupings may increase the network latency for communications between these computing resources. Additionally, in some instances, allocation of these computing resources in different hardware groupings may be unnecessary, since unavailability of one computing resource may result in the unavailability of any associated computing resources, obviating the need for such redundancy. Thus, in some instances, allocation of computing resources within different hardware groupings may result in added expense and inefficiency.

BRIEF DESCRIPTION OF THE DRAWINGS

Various embodiments in accordance with the present disclosure will be described with reference to the drawings, in which.

DETAILED DESCRIPTION

Figure 1:
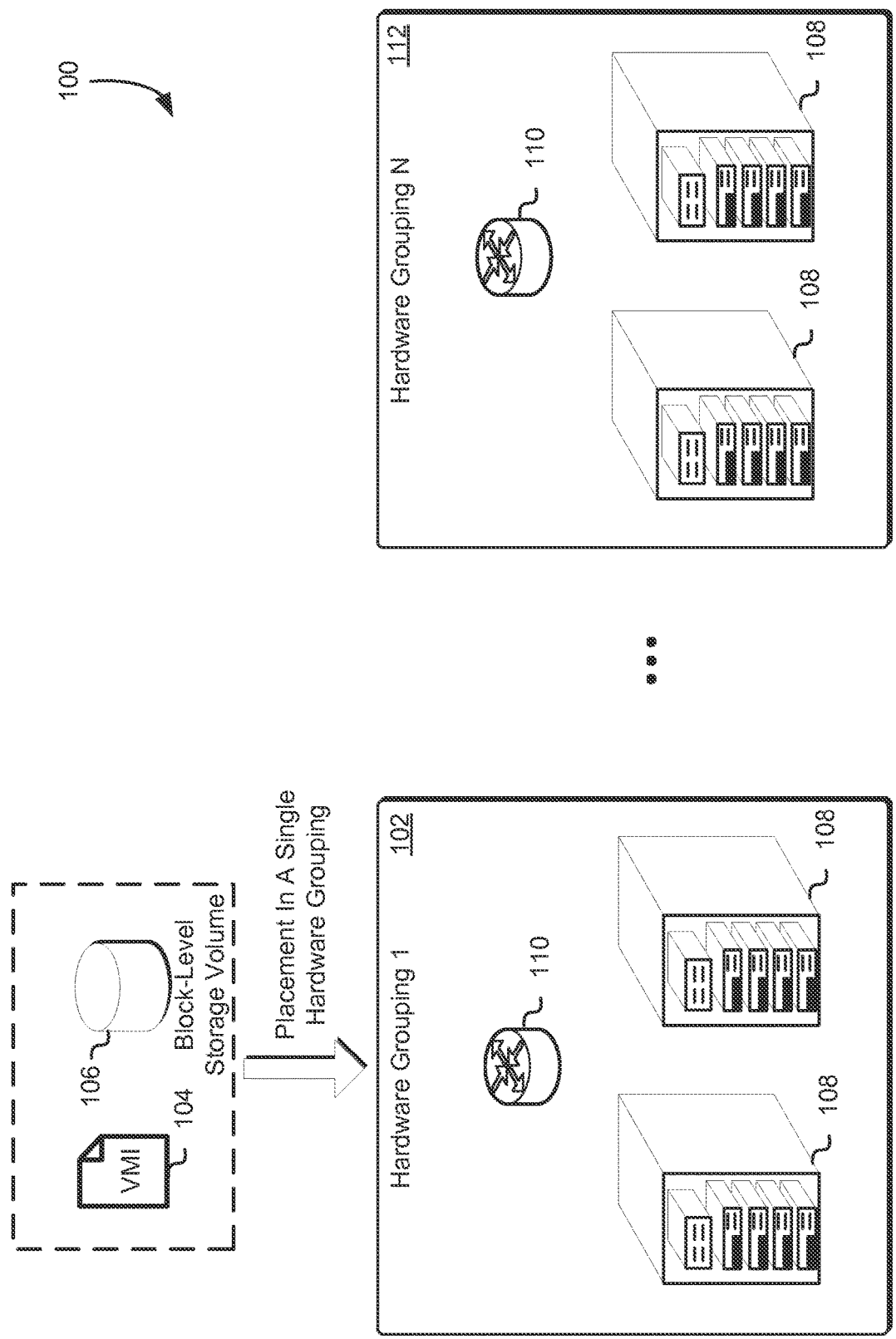
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to computing resource allocation for computing resources within a particular hardware grouping. In an embodiment, a virtual computer system service, operated and managed by a computing resource service provider, receives a request from an entity (e.g., an organization or individual) to instantiate a virtual machine image. The virtual machine instance that is to be instantiated as a result may require one or more data storage volumes in order to enable the entity to store any data generated using the virtual machine instance. Thus, one or more data storage volumes may need to be provisioned to support the virtual machine instance. The entity may be a customer of the computing resource service provider that operates various services such as the aforementioned virtual computer system service, object-based data storage services, database services and other services.

Upon receiving the request from the entity, the virtual computer system service may obtain physical network information to identify hardware groupings provided by the computing resource service provider. A hardware grouping may include one or more hardware devices organized in a particular networking structure (e.g., a server rack, server rack grouping, a data center room, a data center, a data region, etc.). Based on this physical network information, the virtual computer system service may select a hardware grouping and determine the available data storage volume capacity for the grouping. For instance, the virtual computer system may evaluate server rack groupings to determine the overall capacity for each of these server rack groupings. Based on the available storage volume capacity in each hardware grouping, the virtual computer system service may assign a score to each hardware grouping. The virtual computer system service may use these scores to select an appropriate hardware grouping for instantiation of the virtual machine image. Once a hardware grouping has been selected, the virtual computer system service may instantiate the virtual machine image within the selected hardware grouping. While the use of storage volume capacity is used throughout the present disclosure, other factors may be used to determine a score for each hardware grouping, such as available compatible hardware devices, frequency of server outages and the like.

In an embodiment, a block-level data storage service or any other data storage service may receive a request from the entity to provision a data storage volume that is to be associated with an existing virtual machine instance or a virtual machine instance that is to be created at the same time. In response to the request, the block-level data storage service may obtain the physical network information to identify the hardware grouping that either includes the existing virtual machine instance or has been assigned for provisioning of the virtual machine instance. Once the storage service has identified the appropriate hardware grouping, the storage service may determine whether the hardware grouping has sufficient available capacity for the storage volume. If there is insufficient available capacity, the data storage service may select a broader hardware grouping to determine whether there is any sufficient available capacity. For instance, if there is insufficient capacity within the server rack grouping that includes the virtual machine instance, the block-level data storage service may determine whether there is sufficient available capacity within the data center room that includes this particular server rack grouping as well as other server rack groupings. Thus, if there is available capacity within any of these other server rack groupings, the data service may select one of these server rack groupings for provisioning of the storage volume.

In this manner, a computing resource service provider or other service provider can allocate a virtual machine instance and any associated data storage volumes within the narrowest hardware grouping possible. In addition, the techniques described and suggested herein facilitate additional technical advantages. For example, because, in some embodiments, the virtual computer system service uses a scoring mechanism to identify and select for instantiation a hardware grouping with a greater amount of storage capacity for provisioning an associated storage volume, the block-level data storage service may be more likely to provision the storage volume within this same hardware grouping. This, in turn, may reduce the amount of network latency that may occur as a result of network communications between the virtual machine instance and the associated storage volume. Additionally, this may provide increased simplicity, as network communications may no longer need to be routed through myriad networking devices to perform a task utilizing the virtual machine instance and the associated data storage volume.

FIG. 1 shows an illustrative example of an environment 100 in which various embodiments can be implemented. In the environment 100, a virtual computer system service may receive a request to instantiate one or more virtual machine images 104 for use by a customer or other user within the computing resource service provider network. Additionally, a customer may request that a particular data storage volume be provisioned in order to provide storage capacity for the virtual machine instance that is to be created. For instance, in an embodiment, the virtual computer system service enables the customer, through an interface, to specify an amount of capacity that is to be allocated to the virtual machine instance. Based at least in part on the customer's specified amount of capacity, the virtual computer system service, through a management sub-system configured to manage customer requests and coordinate operations for the virtual computer system service, may communicate with a block-level data storage service, or another data storage service, through one or more application programming interface (API) calls to the service, to request provisioning of one or more storage volumes 106 that may fulfill the customer's capacity specifications. Alternatively, the customer may submit a request to the block-level data storage service through an alternative interface to request provisioning of these one or more storage volumes 106 after instantiation of the one or more virtual machine images 104.

Once the virtual computer system service has received, through the interface, the customer's request to instantiate a virtual machine image 104, the virtual computer system service may cause a hardware analysis application or the management sub-system to obtain physical network information detailing the physical organization of various networking devices within the computing resource service provider network, power supplies for these various networking devices and the network capabilities of these networking devices. For instance, this physical network information may define the location of one or more server racks 108 and routers 110 within a data center, within a data center room, within a server rack grouping and the like. These one or more server racks 108 and routers 110 may be organized into one or more hierarchical hardware groupings 102-112. For instance, a narrow hardware grouping 102 may include one or more server racks 108 having a set of hardware devices that are connected to each other through an aggregation router 110, such that communications from one server rack to another server rack within the hardware grouping may only require transmitting data through the aggregation router 110. Alternatively, a narrow hardware grouping 102 may include one or more server racks 108 having a set of hardware devices that share the same network and/or power supply topology. Any computing resources that are allocated within this narrow hardware grouping 102 may share the same fate (e.g., they may experience a "correlated failure" or "joint failure"). For instance, in the event of a power failure or network failure, the resources allocated within the particular narrow hardware grouping 102 may fail together and share the same fate. Generally, resources associated with one another may be specifically grouped in various ways so that the resources share the same fate upon the occurrence of a failure.

The aggregation router 110 may be a lower-tier component within a Clos network architecture. For instance, each aggregation router 110 may be connected to each upper-tier router (e.g., distribution routers) of the network, forming a full-mesh topology. In some embodiments, each grouping 102 may include an aggregation router pair to provide redundancy in the event that an aggregation router of the pair fails. Alternatively, a broader hardware grouping 102, as will be described in greater detail below in connection with FIG. 2, may include a plurality of server rack groupings (e.g., server racks connected to each other through an aggregation router) that are connected to one another through a distribution router within a data center (e.g., the distribution router is connected to the aggregation routers such that a hardware device within a server rack may be able to communicate with another hardware device in another server rack in a different server rack grouping). Alternatively, a broader hardware grouping 102 may include a plurality of server rack groupings connected to one another through a broader power supply topology and/or network topology.

Utilizing this physical network information, the hardware analysis application of the virtual computer system service may evaluate each hardware grouping 102 to determine the available storage volume capacity for each of these hardware groupings 102. For instance, the hardware analysis application of the virtual computing system service may select a first hardware grouping 102, such as a server rack grouping, to determine a number of server racks within the grouping having a set of hardware devices that are reserved for data storage volumes 106. The data storage volumes 106, in some embodiments, may be virtualized such that the data storage volumes 106 may be spread out across one or more servers within a server rack. Further, for each of these server racks 108, the hardware analysis application may identify the amount of capacity available in the set of hardware devices for each server rack 108 to obtain an accurate assessment of the available capacity within the hardware grouping 102. The management sub-system system of the virtual computer system service may utilize the information garnered by the hardware analysis application to assign a score to each hardware grouping 102 based at least in part on the determined available storage capacity within each of these hardware groupings 102. For instance, a hardware grouping 102 may be assigned a high score if the hardware grouping 102 includes a significant number of server racks 108 having a set of hardware devices usable to provision data storage volumes 106 and these hardware devices in the server racks 108 have ample capacity to accommodate a new data storage volume 106. Alternatively, a lower score may be assigned to a particular hardware grouping 102 if there are few server racks 108 within the hardware grouping 102 having hardware devices capable of supporting a new data storage volume 106. Based at least in part on these assigned scores, the virtual computer system service may select a hardware grouping 102 and instantiate the virtual machine image 104.

Once the virtual machine image 104 has been instantiated within a particular hardware grouping 102, the virtual computer system service, using its management sub-system, may communicate with a block-level data storage service, such as through one or more API calls to the service, to request provisioning of one or more data storage volumes 106 that may be used for data storage associated with the virtual machine instance. Alternatively, the block-level data storage service may receive this request from the customer through a service-specific interface, wherein the customer may specify the existing virtual machine instance for which these one or more data storage volumes 106 are to be used for. In response to the request, the management sub-system of the block-level data storage service may obtain the physical network information, either from the virtual computer system service or other service, in order to identify the current hardware grouping 102 of the virtual machine instance.

The block-level data storage service may utilize its own hardware analysis application to evaluate the hardware grouping 102 that includes the virtual machine instance to determine whether this particular hardware grouping 102 has sufficient available capacity to support the one or more requested data storage volumes 106. If the particular hardware grouping 102 does not have sufficient capacity to support these one or more data storage volumes 106, the management sub-system may select a broader hardware grouping and cause the hardware analysis application to determine whether there is sufficient capacity within this broader hardware grouping for the one or more data storage volumes 106. For instance, if the server rack grouping that includes the virtual machine instance does not have sufficient capacity to support the requested one or more data storage volumes 106, the block-level data storage service may identify the data center room that includes not only the particular server rack grouping that includes the virtual machine instance but also other server rack groupings. Alternatively, the block-level data storage service may identify, within a similar network or power supply topology, a grouping of server rack groupings that includes the particular server rack grouping to determine whether any of these have sufficient capacity to fulfill the request. The hardware analysis application may evaluate each hardware device of these server rack groupings to determine whether any of these have sufficient capacity to fulfill the request. If no capacity is available within this broader grouping, the block-level data storage service may evaluate broader groupings (e.g., the data center, groupings that share a common power grid or broader network topology and so forth) until it is able to identify any server rack groupings that have available capacity.

It should be noted that in some embodiments, the one or more data storage volumes 106 may be partitioned such that different partitions of the data storage volume 106 are stored in different physical storage devices. For such embodiments, the block-level data storage service may evaluate the hardware grouping 102 to determine whether this particular hardware grouping 102 has sufficient available capacity to support a particular number of the one or more partitions in a manner that the partitions share the same fate upon the occurrence of a failure. For instance, the block-level data storage service may evaluate the hardware grouping 102 to determine whether a majority of the one or more partitions that comprise the data storage volumes 106 may be provisioned utilizing the hardware components of the particular hardware grouping. In some embodiments, when the data storage volume is partitioned (e.g., during provisioning of the data storage volume 106 or for a re-partitioning), the storage devices that store the partitions may be selected from the hardware grouping 102 such that a number of the partitions (e.g., all of the partitions) share the same fate upon occurrence of a particular type of failure. Similarly, a computer system (e.g., a virtual computer system hosted by a virtual computer system service) may have multiple data storage volumes 106 operably attached to it. Selection of the physical storage volumes to store the data of the multiple data storage volumes 106 may be performed such that the data storage volumes 106 operably attached to the computer system share the same fate as each other and/or the computer system upon occurrence of a particular type of failure.

Once the management sub-system has identified a hardware grouping 102 that may be utilized to support the requested one or more data storage volumes 106, the block-level data storage service may provision these one or more data storage volumes 106 within the selected hardware grouping 102. Additionally, the management sub-system of the block-level data storage service may communicate with the virtual computer system service, such as through one or more API calls to the service, to specify the hardware grouping, particularly the one or more servers or server racks 108 including the one or more servers, which include the newly provisioned data storage volumes. This may enable the virtual computer system service to configure the virtual machine instance to utilize these one or more data storage volumes for data storage associated with usage of the virtual machine instance.

As noted above, a virtual computer system service and/or block-level data storage service may allocate one or more computing resources (e.g., virtual machine instances, data storage volumes, etc.) within a particular hardware grouping based at least in part on the availability of data storage capacity for one or more data storage volumes. For instance, a virtual computer system service may identify a particular hardware grouping for instantiation of a virtual machine image based at least in part on an assigned score, which may be determined based at least in part on the availability of data storage server racks and capacity within these server racks. In another instance, the block-level data storage service may identify a hardware grouping that includes the virtual machine instance and determine whether the particular hardware grouping has sufficient available capacity for provisioning of one or more data storage volumes that are to be associated to the virtual machine instance. If no capacity is available, the data service may expand its search to incorporate a broader hardware grouping. Accordingly, FIG. 2 shows an illustrative example of an environment 200 that includes one or more hardware groupings 202 comprising various hardware components in accordance with at least one embodiment.

A hardware grouping 202 may include various hardware components that are collectively connected to one another to enable communications amongst these hardware components. For instance, a hardware grouping 202 may include a server rack 204, comprising one or more data servers 206 and a top-of-rack switch 208 usable to enable servers 206 within the server rack 204 to communicate with other servers in other data racks or in the same data rack 204. In an embodiment, a block-level data storage service is configured to identify the narrowest hardware grouping that both includes the virtual machine instance that is to utilize the requested data storage volumes and includes sufficient available capacity for provisioning these requested data storage volumes. Thus, the block-level data storage service may attempt to determine whether the particular service rack 204 that includes the virtual machine instance has sufficient capacity for the requested data storage volumes.

If the particular server rack 204 does not have sufficient capacity, the block-level data storage service may identify a broader hardware grouping 202 and determine whether there is available storage capacity within this broader hardware grouping 202 to fulfill the request. For instance, as illustrated in FIG. 2, the hardware grouping 202 encompasses a plurality of server racks 204 and an aggregation router 210 configured to enable communication amongst the hardware devices in the server racks 204 connected to the aggregation router 210. The hardware grouping 202 may thus include a particular server rack grouping of a plurality of server rack groupings. The block-level data storage service may evaluate the various server racks 204 within this particular hardware grouping 202 to identify any server racks 204 that may have sufficient available capacity to support the requested one or more new data storage volumes.

Figure 2:
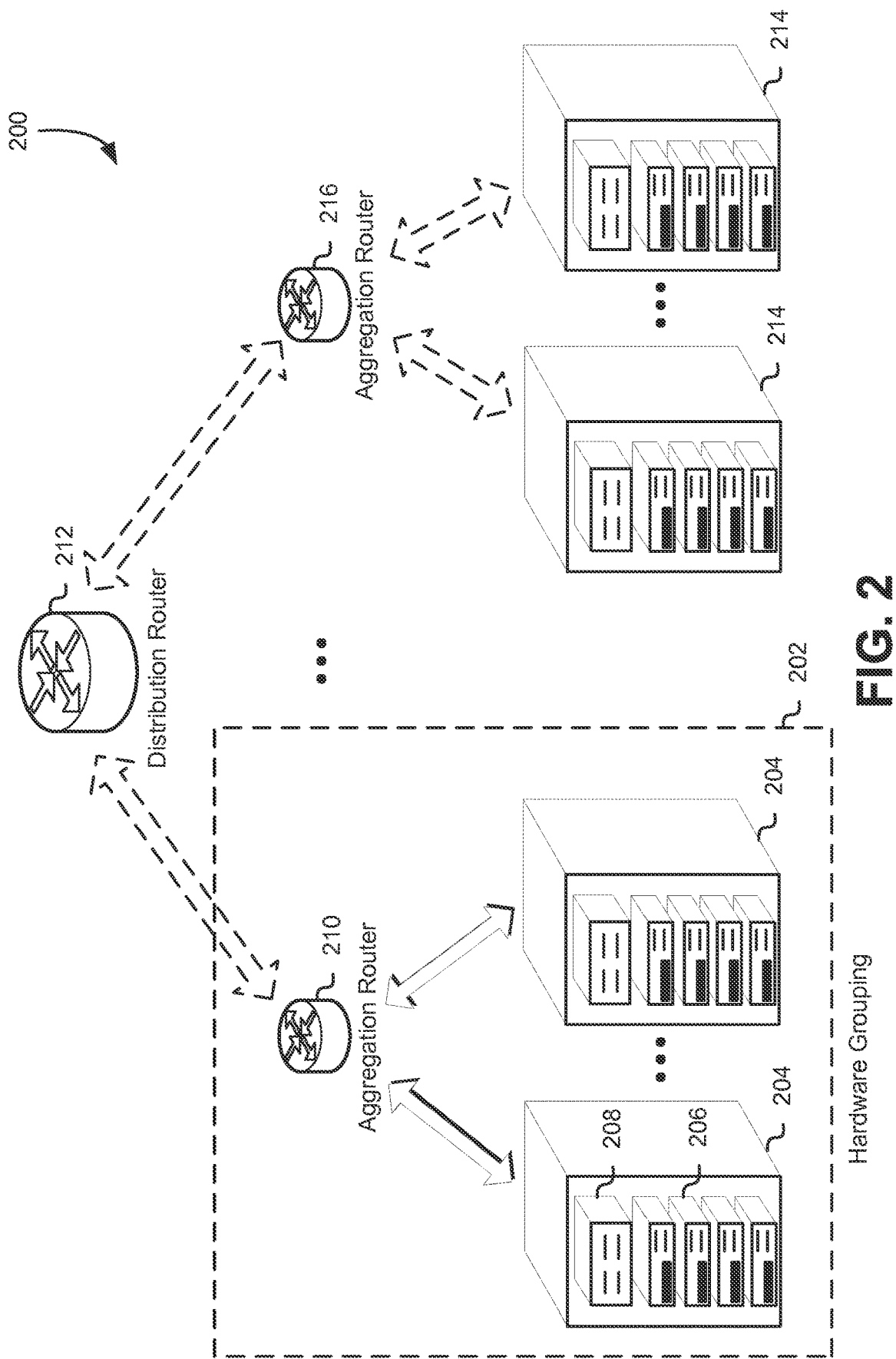
FIG. 2 shows an illustrative example of an environment that includes one or more hardware groupings comprising various hardware components in accordance with at least one embodiment.

As illustrated in FIG. 2, the aggregation router 210 may be connected to a distribution router 212, which may be configured to provide network connectivity across multiple server rack groupings (e.g., various aggregation routers 210, 216 may be connected to the distribution router 212) and aggregate any network traffic from an external network and/or an internal network for delivery to its intended recipient within any of the various server rack groupings connected to the distribution router 212. The distribution router 212 may be installed within a particular data center room, data center or some other facility to provide such network connectivity across these multiple server rack groupings. For instance, as illustrated in FIG. 2, the distribution router 212 may be configured to provide network connectivity between the server racks 204 included in the present hardware grouping 202 and other server racks 214 connected to the distribution router 212 through their own aggregation router 216. In some embodiments, the distribution router 212 may be located in a separate facility than the facility wherein the other hardware components may be located.

If the virtual machine instance is installed within a server rack 204 in the present hardware grouping 202, provisioning of the one or more requested data storage volumes within a different server rack grouping, such as in server racks 214, may result in increased network latency and inefficiency. For instance, if the virtual machine instance included in a server rack 204 is utilized and requires access to a data storage volume provisioned within a server rack 214, the virtual machine instance may be required to transmit a request through the aggregation router 210, which may forward the request to the distribution router 212. In response to this, the distribution router 212 may be required to identify the correct aggregation router 216 configured to service the one or more server racks 214 wherein the data storage volumes are included and transmit the request to this aggregation router 216. This may cause the aggregation router 216 within this second server rack grouping to identify the server rack 214 that includes the data storage volume and transmit the request to the volume.

Thus, by selecting the narrowest hardware grouping 202 possible, the block-level data storage service may be able to potentially reduce the added latency and inefficiency that may be incurred by the computing resource service provider network. For instance, if the virtual machine instance is installed within a server rack 204 in a particular hardware grouping 202, the block-level data storage service may first determine whether this particular hardware grouping 202 (e.g., any server rack 204 within the server rack grouping) has sufficient available capacity to enable provisioning of the requested one or more data storage volumes. If there is sufficient capacity available, the block-level data storage service may select a server rack 204 from the plurality of server racks within the hardware grouping 202 and provision the requested data storage volumes. Thus, a request from a virtual machine instance to store data within the one or more data storage volumes may entail transmitting the request from the server rack 204 to the aggregation router 210, which in turn may identify the server rack that includes the one or more data storage volumes within the particular server rack grouping and transmit the request to this server rack. This may obviate the need to transmit the request to the distribution router 212 and, accordingly, any other server rack groupings, data center rooms, data centers and the like.

In an embodiment, the virtual computer system service is configured assign a score to one or more hardware groupings 202 based at least in part on a number of server racks available within each hardware grouping 202 that is capable of supporting one or more data storage volumes and the available storage capacity within this number of server racks. For instance, a higher score may be assigned to a particular hardware grouping 202 if it includes numerous server racks 204 configured to provide storage capacity for one or more data storage volumes and these numerous server racks 204 include sufficient available capacity to enable provisioning of these one or more data storage volumes. Alternatively, a lower score may be assigned to a particular hardware grouping if there are few server racks configured to provide storage capacity for these one or more data storage volumes and/or have insufficient available capacity to support these data storage volumes. The score may thus be assigned in a manner that correlates with the available capacity for the hardware devices in the server racks. While server rack assignments and available storage capacity are used extensively through the present disclosure to determine a score for virtual machine instance allocation, other criteria may be utilized to determine this score. For instance, in some embodiments, the virtual computer system service may evaluate each of these server racks to determine the hardware specifications of the server racks and, based at least in part on these hardware specifications, assign an appropriate score to the hardware grouping. For example, if a customer has specified that he/she prefers to have a virtual machine instance installed on newer hardware, the virtual computer system service may assign a greater score to a hardware grouping that includes newer hardware.

Once the virtual computer system service has assigned a score to each hardware grouping 202, the virtual computer system service may select the hardware grouping with the highest assigned score and select an appropriate server rack 204 within the hardware grouping 202 for instantiation of the selected virtual machine image. Since the highest score may be assigned to a hardware grouping 202 that includes a high number of server racks capable of supporting one or more data storage volumes and collectively include sufficient available capacity for these one or more data storage volumes, there is a greater probability that when a request is received by the block-level data storage service to provision one or more data storage volumes for the virtual machine instance, the block-level data storage service may be able to identify the same hardware grouping 202 in which the virtual machine instance is installed.

Figure 3:
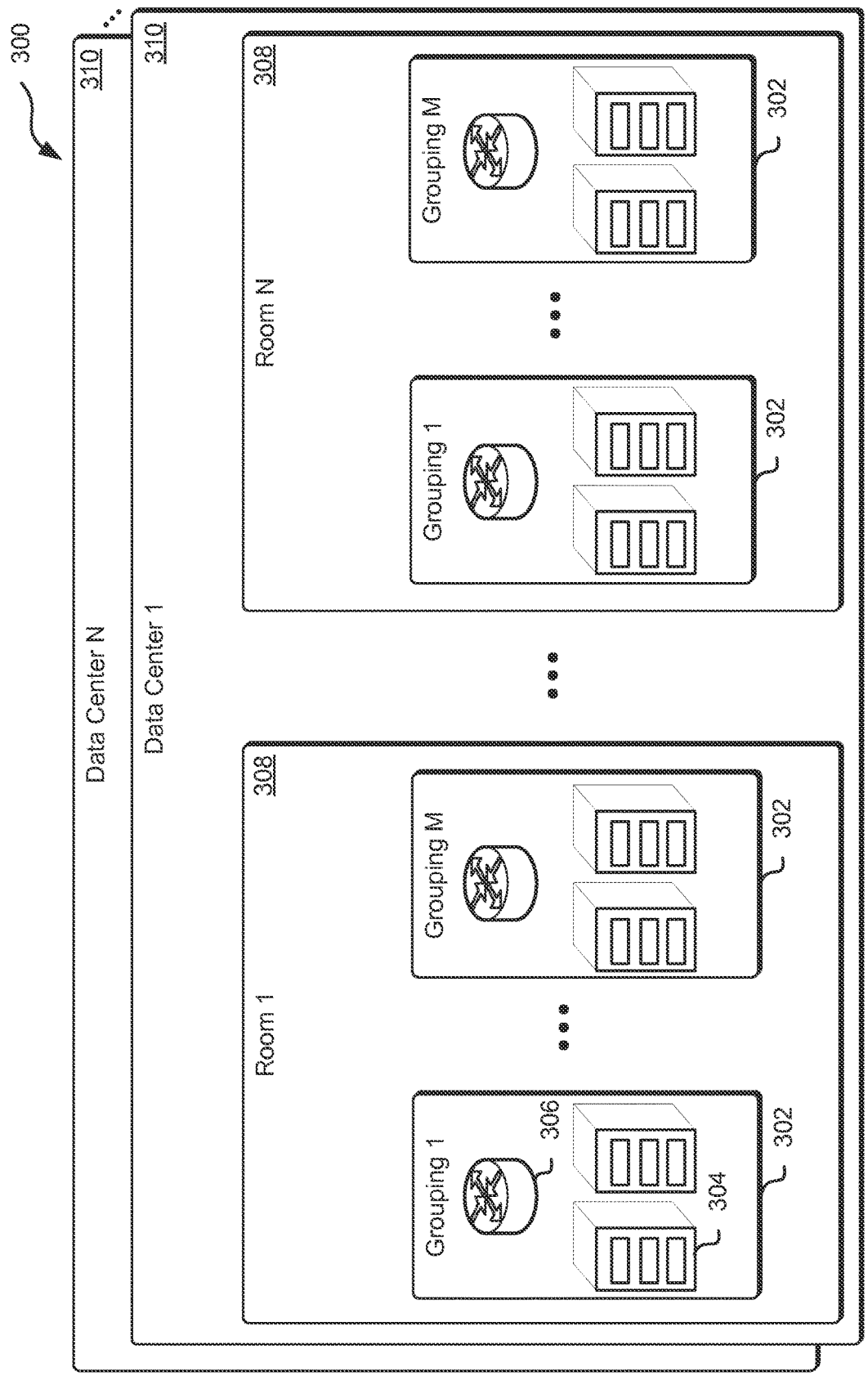
FIG. 3 shows an illustrative example of an environment that includes a hierarchy of one or more hardware groupings in accordance with at least one embodiment.

As noted above, a block-level data storage service may be configured to provision one or more data storage volumes within the narrowest hardware grouping that includes the virtual machine instance that will be utilizing these data storage volumes and includes sufficient available capacity to support these one or more data storage volumes. Additionally, a virtual computer system service may select, from a plurality of these narrowest hardware groupings, a hardware grouping that not only includes a significant number of server racks configured to support these one or more data storage volumes but that also have such sufficient available capacity to enable provisioning of these one or more data storage volumes. These hardware groupings may be defined based at least in part on the physical network configuration of the computing resource service provider network. Accordingly, FIG. 3 shows an illustrative example of an environment 300 that includes a hierarchy of one or more hardware groupings in accordance with at least one embodiment.

In some embodiments, a virtual computer system service may receive a request from a customer to instantiate a virtual machine image within the computing resource service provider network. In response to this request, the virtual computer system service may first identify which server configuration is required to instantiate the virtual machine image (e.g., hardware specifications, including but not limited to: processor type, processing speed, random-access memory (RAM) allocation, physical storage requirements, etc.). Subsequently, the virtual computer system service may identify any server rack groupings 302 that include any servers 304 that may satisfy these server configuration requirements.

The virtual computer system service may be configured to assign a score to each of these identified server rack groupings 302 based at least in part on one or more criteria, which may be used to determine the server rack grouping 302 in which the virtual machine image may be instantiated. For instance, as noted above, the virtual computer system service may assign a score to each server rack grouping 302 based at least in part on a number of server racks 304 within each server rack grouping 302 that are capable to support one or more data storage volumes, which may be used to provide data storage capacity for the virtual machine instance. Additionally, the score may further be based at least in part on the available storage capacity within this number of server racks 304 for the one or more data storage volumes. The virtual computer system service may select the server rack grouping 302 with the highest assigned score and instantiate the virtual machine image within any of the server racks 304 included within the server rack grouping 302.

In an embodiment, a block-level data storage service receives a request from a customer or the virtual computer system service to provision one or more data storage volumes that are to be associated with a selected virtual machine instance. In response to the request, the block-level data storage service may select a first hardware grouping and determine whether there is sufficient available capacity to provision the data storage volumes within the selected hardware grouping. For instance, the block-level data storage service may select the narrowest hardware grouping that includes the selected virtual machine instance. Thus, the block-level data storage service may first select a server rack grouping 302, which may include the server rack 304 that includes the selected virtual machine instance, other server racks and an aggregation router 306, which may be configured to enable communications amongst the server racks included in the server rack grouping 302.

If the particular hardware grouping does not include sufficient available capacity to enable provisioning of the one or more requested data storage volumes, the block-level data storage service may expand the hardware grouping to a higher hierarchical plane such that the hardware grouping encompasses additional hardware components. For instance, as illustrated in FIG. 3, if the server rack grouping 302 that includes the virtual machine instance does not have sufficient capacity to enable provisioning of the requested data storage volumes, the block-level data storage service may expand the hardware grouping to include the data center room 308 in which the server rack grouping 302 is located. It should be noted that in some embodiments, the expansion of the hardware grouping to a higher hierarchical plane may be based at least in part on certain physical boundaries not shown in FIG. 3 and may serve as alternatives to the boundaries illustrated in FIG. 3. For instance, the block-level data storage service may expand the hardware grouping to include the server rack groupings included within a fire protection zone, connected to a particular power substation, connected to a particular cooling system and the like. It should also be noted that not all hardware groupings may include the same hardware components within.

The data center room 308 may include one or more server rack groupings 302, which may be connected, via the network, to each other through an additional aggregation router or a distribution router within the data center room 308. If the hardware grouping is expanded to encompass the data center room 308, the block-level data storage service may evaluate each server rack grouping 302 within this data center room 308 to identify any server rack groupings 302 with sufficient available capacity to enable provisioning of the requested data storage volumes. If sufficient available capacity is found, the block-level data storage service may provision the requested one or more data storage volumes within any of the identified server rack groupings 302 within the data center room 308 and transmit information to the virtual computer system service that may cause the virtual computer system service to associate these data storage volumes with the particular virtual machine instance.

If there is insufficient available capacity within the data center room 308, the block-level data storage service may broaden the hardware grouping to include data center rooms 308 within the data center 310. In a similar manner to that described above, the block-level data storage service may evaluate each server rack grouping 302 in each data center room 308 to identify a data center room that has sufficient available capacity to enable provisioning of the requested data storage volumes. These data center rooms 308 within the data center 310 may be connected to each other, via the computing resource service provider network, through one or more distribution routers. If a data center room 308 is identified, the block-level data storage service may select one or more server racks 304 within a server rack grouping 302 in the identified data center room 308 and provision the data storage volumes. Otherwise, the block-level data storage service may continue to broaden the hardware grouping to encompass various data centers 310 in a data region, various data regions and the like until sufficient capacity may be located.

In an embodiment, the block-level data storage service is configured to broaden the hardware grouping to a particular hierarchical level, upon which if no capacity is found, the block-level data storage service may deny the request to provision the one or more data storage volumes. For instance, a customer may specify within the request that the one or more data storage volumes must be provisioned within the same data center room 308 as the selected virtual machine instance. In response to the request, the block-level data storage service may attempt to identify any server racks 304 within a server rack grouping 302 that have sufficient available capacity to support these requested one or more data storage volumes. If no server racks 304 within the server rack grouping 302 are identified, the block-level data storage service may only be able to expand the hardware grouping to include the data center room 308 that includes the virtual machine instance. If there is no sufficient available capacity to provision the requested one or more data storage volumes within this data center room 308, the block-level data storage service may deny the customer's request and allow the customer to expand the breadth of the hardware grouping.

Figure 4:
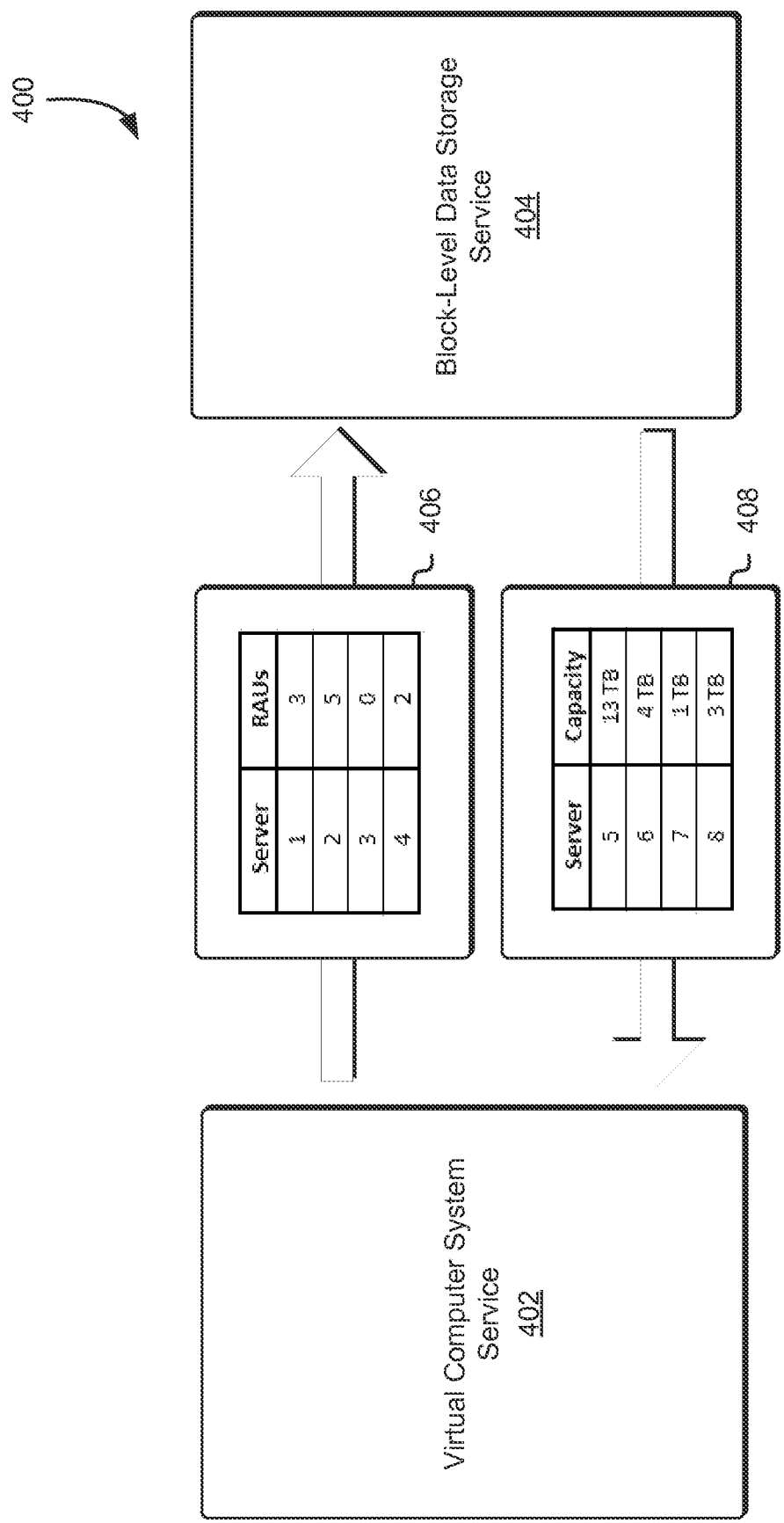
FIG. 4 shows an illustrative example of an environment in which hardware grouping information is provided amongst one or more computing resource services for computing resource allocation in accordance with at least one embodiment.

As noted above, a customer of the computing resource service provider may submit a request to a virtual computer system service to instantiate one or more virtual machine images for use within the computing resource service provider network. Additionally, through a block-level data storage service, a customer may request provisioning of one or more data storage volumes that may be used to provide data storage capacity for the new virtual machine instances. In some embodiments, the virtual computer system service, based at least in part on the customer's request, may identify a server rack grouping that may not only be used to instantiate the selected virtual machine images, but also includes sufficient available data storage capacity for provisioning of any data storage volumes that are to be used in conjunction with these one or more virtual machine instances. Alternatively, if a customer opts to request provisioning of the one or more data storage volumes prior to instantiation of these one or more virtual machine images, the block-level data storage service may identify any server rack groupings that include sufficient capacity for the virtual machine instances. Accordingly, FIG. 4 shows an illustrative example of an environment 400 in which hardware grouping information 406, 408 is provided amongst one or more computing resource services 402, 404 for computing resource allocation in accordance with at least one embodiment.

In an embodiment, a customer of the computing resource service provider utilizes an interface to access a virtual computer system service 402 to request instantiation of one or more virtual machine images, which may cause the virtual computer system service 402 to provision one or more resource allocation units (RAUs) for the virtual machine instances. In order to identify a server rack grouping for instantiation of the one or more virtual machine images, the virtual computer system service 402 may obtain physical network information usable to determine the available storage capacity within the one or more server racks in these server rack groupings. For instance, the virtual computer system service 402 may transmit, to a block-level data storage service 404, a request to obtain a database table 408 specifying the available capacity within each server/server rack in available server rack groupings.

In response to the request, the block-level data storage service 404 may provide the virtual computer system service 402 with the requested database table 408. The virtual computer system service 402 may utilize the information included within this database table 408 to assign a score to each available server rack grouping, which may be used to determine which server rack grouping will be utilized for instantiation of the one or more virtual machine images. This score may be based at least in part on a ratio of server racks configured for use by the virtual computer system service 402 (e.g., may include only virtual machine instances and virtual machine images) and server racks configured for use by the block-level data storage service 404 (e.g., usable to provision one or more data storage volumes). Additionally, the score may be based at least in part on the available storage capacity within the server racks configured for use by the block-level data storage service 404. Using these assigned scores, the virtual computer system service 402 may select a particular server rack grouping that includes not only sufficient capacity for the requested virtual machine instances but also sufficient available capacity within the server racks in the selected server rack grouping such that it is more likely that a request received by the block-level data storage service 404 to provision one or more data storage volumes may be fulfilled using this selected server rack. While available storage capacity is used extensively throughout the present disclosure as a metric for determining the score for each available server rack grouping, other metrics may additionally or alternatively be used to determine the score. For instance, the virtual computer system service 402 may utilize other information, such as available or average bandwidth, physical storage device health, data storage type (e.g., magnetic drives, solid-state drives), and the like to determine which grouping is to be used.

In an alternative embodiment, a customer utilizes the aforementioned interface to access the block-level data storage volume 404 to request provisioning of one or more data storage volumes. Through the interface, a customer may specify that these one or more data storage volumes may be used, at a later time to support one or more virtual machine instances. Accordingly, the block-level data storage service 404 may transmit a request to the virtual computer system service 402 to request physical network information for one or more server rack groupings within the computing resource service provider network. Each virtual machine instance may require allocation of one or more RAUs. Each server within a server rack may be configured to have a limited number of RAUs based at least in part on the hardware configuration of the server (e.g., processing power, storage capacity, RAM, etc.). Thus, a server with a lower number of RAUs may not be as desirable, as smaller virtual machine images may be instantiated using these servers.

The virtual computer system service 402, in response to the request from the block-level data storage service 404, may provide a RAU database table 406, which may specify the number of RAUs available in the servers within one or more server rack groupings. Similar to the process described above for determining which server rack grouping is to be utilized for instantiation of one or more virtual machine images, the block-level data storage service 404 may utilize the RAU database table 406 to assign a score to each server rack grouping, which may be used to select the server rack grouping for provisioning of the requested one or more data storage volumes. For instance, the block-level data storage service 404 may assign a higher score to a server rack grouping that includes a significant amount of servers with ample RAUs for instantiation of one or more virtual machine images.

Based at least in part on these assigned scores, the block-level data storage service 404 may select the server rack grouping with the highest score and provision the requested one or more data storage volumes. Thus, if the customer later submits a request to instantiate one or more virtual machine images and specifies that these one or more data storage volumes are to be associated with the new virtual machine images, the virtual computer system service 402 may be able to instantiate these one or more virtual machine images within the same server rack grouping that includes the previously provisioned one or more data storage volumes.

Figure 5:
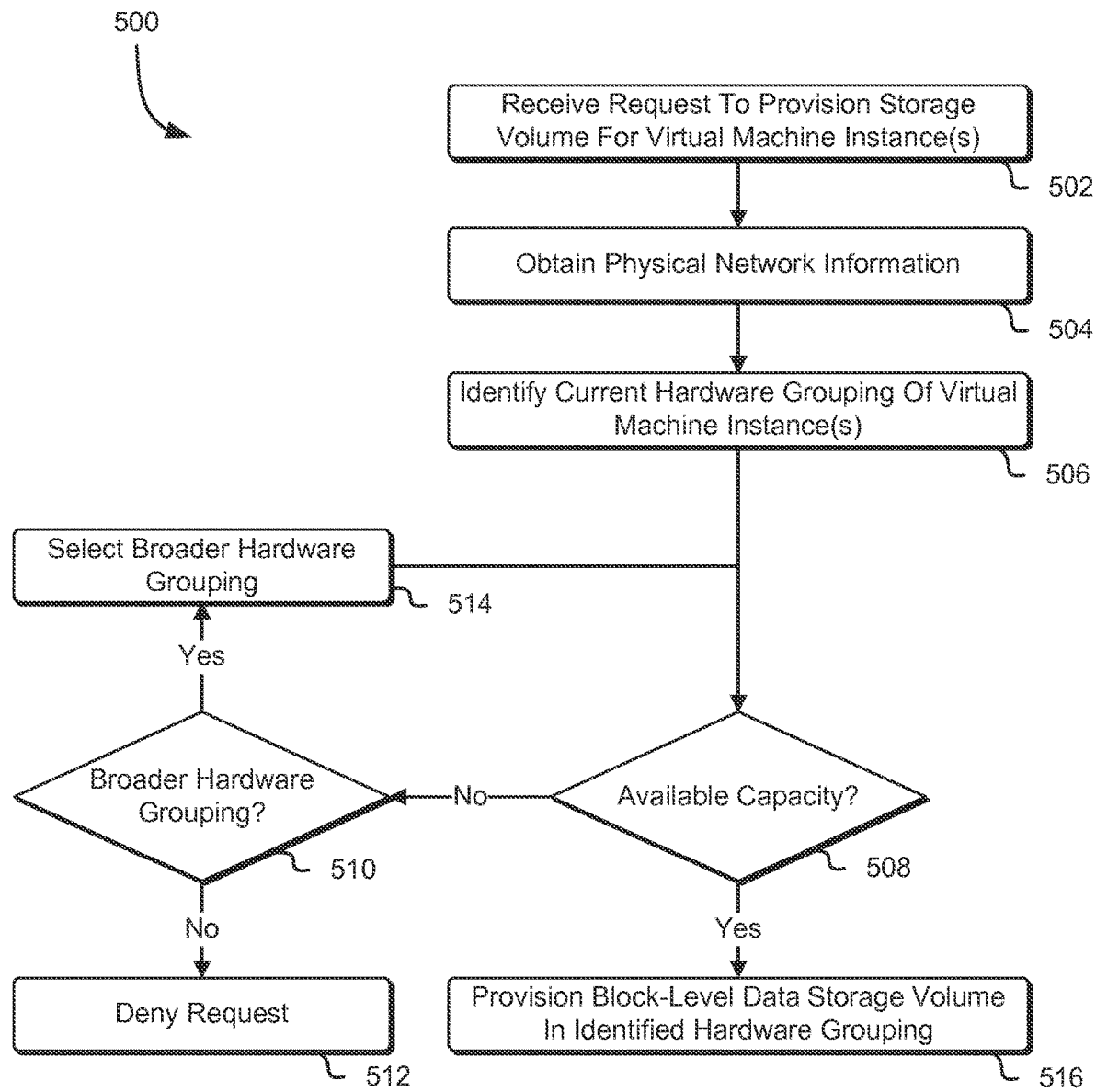
FIG. 5 shows an illustrative example of a process for provisioning a data storage volume associated with a virtual machine instance in a hardware grouping in accordance with at least one embodiment.

As noted above, a customer may submit a request to a block-level data storage service to request provisioning of one or more data storage volumes that may be associated with one or more existing or coincident virtual machine instances. The block-level data storage service, in response to the request, may provision these one or more data storage volumes in the narrowest hardware grouping that includes the existing virtual machine instances or that has been selected for allocation of the virtual machine instances that are to be allocated in conjunction with these data storage volumes. Thus, FIG. 5 shows an illustrative example of a process 500 for provisioning a data storage volume associated with a virtual machine instance in a hardware grouping in accordance with at least one embodiment. The process 500 may be performed by the aforementioned block-level data storage service or any other data storage service that includes one or more components configured to obtain physical network information from a virtual computer system service and identify one or more possible hardware groupings for provisioning of the data storage volumes.

At any point, the block-level data storage service may receive 502 a request to provision one or more data storage volumes that are to be associated with an existing virtual machine instance or a virtual machine instance that is to be allocated in conjunction with these data storage volumes. The request may be submitted by a customer of the computing resource service provider through an interface of the block-level data storage service, wherein the customer may specify that the one or more data storage volumes are to be associated with one or more existing virtual machine instances. Alternatively, the block-level data storage service may receive the request, at a management sub-system of the block-level data storage service, from a virtual computer system service. For instance, a customer may utilize an interface of the virtual computer system service to request instantiation of one or more virtual machine images. Additionally, the customer may specify that one or more data storage volumes should be associated with these one or more virtual machine instances to enable the customer to store data generated using these one or more virtual machine instances. This may cause the virtual computer system service to communicate with the management sub-system of the block-level data storage service, such as through one or more API calls to the service, to request provisioning of these one or more data storage volumes.

Once the block-level data storage service has received the request from either the customer or the virtual computer system service to provision the one or more data storage volumes, the block-level data storage service, through the management sub-system, may obtain 504 physical network information for the computing resource service provider network. For instance, the management sub-system of the block-level data storage service may submit a request to a network management service to obtain a detailed physical description of the network layout of a data center. The selected data center may include one or more rooms wherein each room includes one or more server rack groupings. Additionally, the selected data center may include the associated one or more virtual machine instances within one of the server rack groupings in the data center. In order to obtain the relevant physical network information, the management sub-system of the block-level data storage service may communicate with the virtual computer system service to determine the server rack grouping that includes the one or more virtual machine instances that are to be associated with the one or more data storage volumes to be provisioned. This physical network information may be stored within one or more data stores of the block-level data storage service, wherein the management sub-system may access this information at any time.

With the physical network information and the information provided by the virtual computer system service, the management sub-system of the block-level data storage service may access the physical network information from the one or more data stores to identify 506 the current hardware grouping that includes the associated one or more virtual machine instances. As noted above, a hardware grouping may include one or more hierarchical hardware configurations, such as a server rack grouping, a data center room, a data center and the like. The management sub-system may select the lowest hierarchical hardware configuration that includes the one or more virtual machine instances for analysis. For instance, in an embodiment, the management sub-system will initially identify the server rack grouping that includes the one or more virtual computer system service.

The management sub-system of the block-level data storage service may subsequently determine 508 whether the identified hardware grouping, in this case the server rack grouping that includes the one or more virtual machine instances, has sufficient available capacity for provisioning of the requested one or more data storage volumes. The block-level data storage service, through the management sub-system or other application configured to access one or more server racks, may evaluate the server racks within the server rack grouping to obtain information regarding the available capacity within each server included in these server racks. If there is no available capacity within this particular hardware grouping, the management sub-system may utilize the physical network information from the one or more data stores to determine 510 whether there are any broader hardware groupings. For instance, if the server rack grouping does not have sufficient capacity for the one or more data storage volumes to be provisioned, the management sub-system may broaden the hardware grouping to include server rack groupings within the data center room that includes the one or more associated virtual machine instances.

In an alternative embodiment, the management sub-system of the block-level data storage service utilizes one or more elements in addition to the available capacity of the hardware grouping to determine whether the requested one or more data storage volumes may be provisioned therein. For instance, the management sub-system may utilize an ordering of hardware groupings to determine which hardware grouping may be used to provision the requested one or more data storage volumes. For example, the ordering of hardware groupings may specify, in addition to the hardware grouping of the one or more virtual machine instances, one or more hardware groupings that may have available capacity for provisioning the one or more data storage volumes. In some embodiments, the first hardware grouping specified within the ordering of hardware groupings may be the hardware grouping that includes the one or more virtual machine instances. The management sub-system may select, from this ordering, a hardware grouping and attempt to provision the requested one or more data storage volumes. If it is not successful, the management sub-system may continue to select other hardware groupings from this ordering until one is identified that is usable for provisioning the requested one or more data storage volumes.

In some embodiments, the block-level data storage service may be constrained to a particular hardware grouping based at least in part on the customer's request or physical limitation. For instance, a customer may specify, through the block-level data storage service interface, that the one or more data storage volumes must be within the server rack grouping as the one or more associated virtual machine images. Thus, if there is no broader hardware grouping available and the current hardware grouping does not have sufficient capacity for the one or more data storage volumes, the block-level data storage service may deny 512 the request to provision the one or more data storage volumes. Alternatively, if there are no constraints present to the selection of a broader hardware grouping, the management sub-system of the block-level data storage service may select 514 the broader hardware grouping and determine 508 whether any server rack groupings within this broader hardware grouping have sufficient available capacity for provisioning of the requested one or more data storage volumes. The management sub-system may continue to attempt to find available capacity until such capacity is found within the selected broader hardware grouping or until a defined and/or physical constraint (e.g., no broader hardware groupings beyond a datacenter, etc.) has been reached.

If the block-level data storage service is able to determine that there is available capacity within the currently selected hardware grouping, the management sub-system may provision 516 the one or more data storage volumes within one or more server racks in the hardware grouping. Additionally, in some embodiments, the management sub-system may transmit information about the provisioned data storage volumes to the virtual computer system service, to enable the virtual computer system service to associate these one or more data storage volumes with the one or more virtual machine instances and enable a customer to utilize these data storage volumes for data storage associated with these instances.

It should be noted that the process 500 may also be performed by a virtual computer system service and its various components, which may be configured to instantiate one or more virtual machine images and associate the virtual machine instances with one or more existing data storage volumes. Thus, the process 500, in some embodiments, may be performed utilizing additional and/or alternative steps. For instance, if the process 500 is performed by the aforementioned virtual computer system service, the virtual computer system service may instead receive 502, through an interface of the virtual computer system service, a request to instantiate one or more virtual machine images that are to be associated with one or more existing data storage volumes. Additionally, a management sub-system of the virtual computer system service may obtain physical network information from the block-level data storage service, such that the virtual computer system service may be able to identify the hardware grouping that includes these one or more data storage volumes. Once the virtual computer system service is able to identify a hardware grouping with sufficient available RAUs for the requested virtual machine instances, the management sub-system of the virtual computer system service may instantiate the one or more virtual machine images within one or more server racks in the identified hardware grouping.

Figure 6:
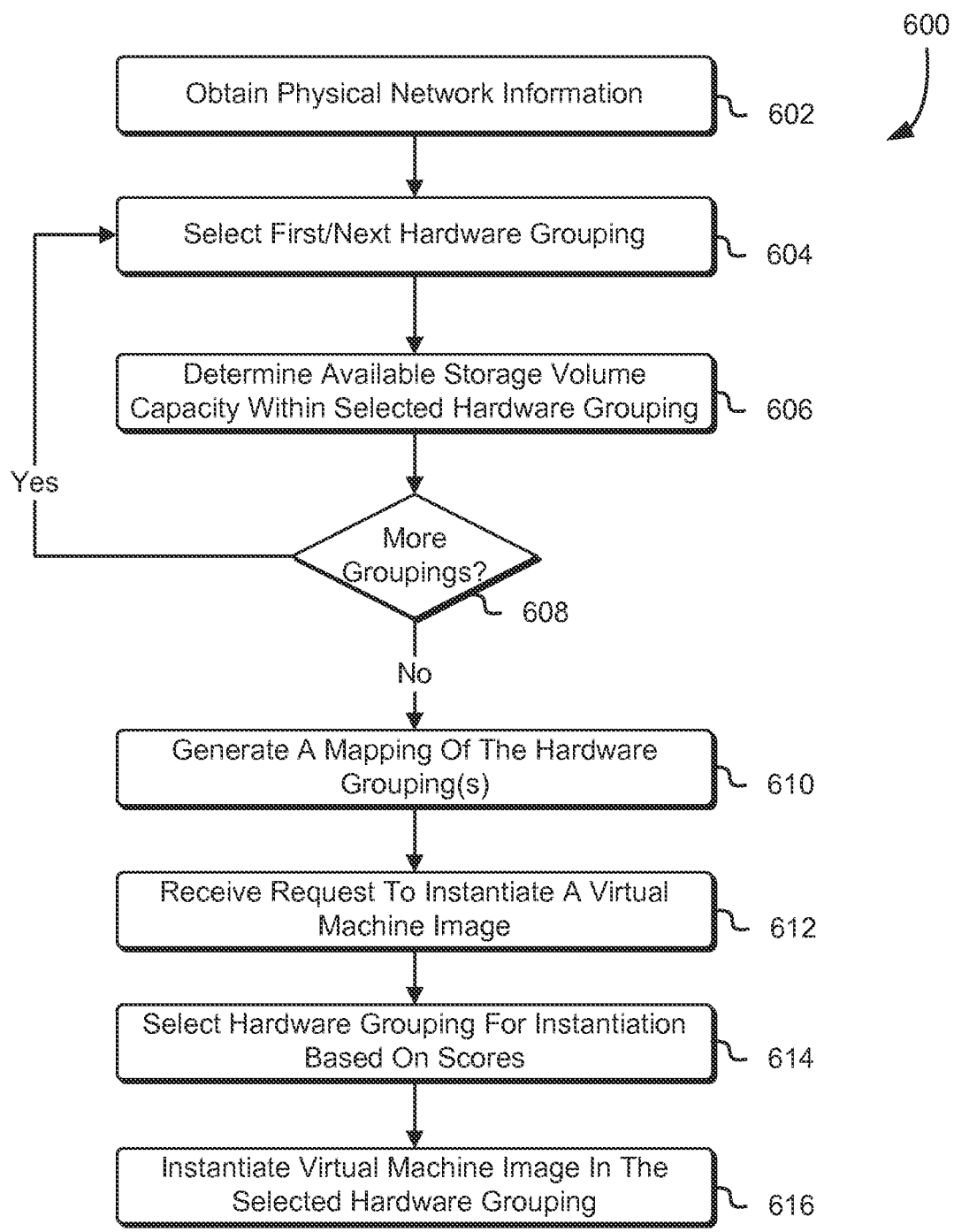
FIG. 6 shows an illustrative example of a process for selecting a hardware grouping for computing resource allocation based at least in part on a determined score in accordance with at least one embodiment.

As noted above, a virtual computer system service may receive, through an interface, a request from a customer to instantiate one or more virtual machine images. The request may not specify whether any data storage volumes are to be associated with these about to be created virtual machine instances. However, at a later time, one or more data storage volumes may be provisioned, on behalf of the customer, that are to be associated with these one or more virtual machine instances. Thus, the virtual computer system service may be configured to be cognizant of this possibility and attempt to instantiate the one or more virtual machine images in a particular hardware grouping that has sufficient available capacity for provisioning of one or more data storage volumes. Accordingly, FIG. 6 shows an illustrative example of a process 600 for selecting a hardware grouping for computing resource allocation based at least in part on a determined score in accordance with at least one embodiment. The process 600 may be performed by the aforementioned virtual computer system service and its one or more components, which may be configured to instantiate one or more virtual machine images within a server rack and a block-level data storage service, which may be configured to generate a mapping of hardware groupings which may be used to select a hardware grouping for instantiation of a virtual machine image. This server rack may be part of a particular hardware grouping, which may be defined as a server rack grouping, a data center room, a data center, a data region and the like.

In the process 600, a management sub-system of the block-level data storage service may obtain 602 physical network information for the computing resource service provider network in order to obtain a score for each hardware grouping and utilize these scores to generate a mapping of the hardware groupings. For instance, the management sub-system may submit a request to a network management service to obtain a floor plan of one or more data centers that may include a plurality of data center rooms, server rack groupings and server racks, as well as the interconnectivity amongst these various server racks throughout the one or more data centers. The management sub-system may further analyze these server racks to determine the amount of physical server racks that may be configured to provide storage capacity for one or more data storage volumes.

Utilizing the obtained physical network information from the network management service, the management sub-system may select 604 a first hardware grouping. As noted above, a hardware grouping may be defined narrowly to only include a particular server rack grouping, which may include one or more server racks connected to each other in the network through an aggregation router. Alternatively, the hardware grouping may be defined more broadly to include a data center room, a data center, a data region comprising various data centers and the like. The definition of the hardware grouping may be selected by an administrator of the computing resource service provider, a customer or other authorized entity.

Once the management sub-system has selected a first hardware grouping, the management sub-system may cause a hardware analysis application to evaluate the hardware grouping to determine 606 the available storage capacity within this particular hardware grouping that may be utilized to provision one or more data storage volumes. For instance, the management sub-system, through this hardware analysis application, may utilize the obtained physical network information to identify a number of server racks within the selected hardware grouping that are configured exclusively for use in provisioning and supporting one or more data storage volumes. Additionally, the hardware analysis application may determine the available storage capacity within this number of server racks for the provisioning of one or more data storage volumes that may be used in association with the one or more virtual machine instances. The management sub-system may utilize the physical network information from the one or more data stores to determine 608 whether there are any additional hardware groupings and, if so, perform the same analysis for each of these hardware groupings.

Based at least in part on the number of server racks configured exclusively for use in provisioning and supporting one or more data storage volumes and the available storage capacity within this number of server racks in each of the hardware groupings, the block-level data storage service, through the management sub-system, may assign a score to each of these hardware groupings and generate 610 a mapping of these hardware groupings based at least in part on these scores. For instance, a higher score may be assigned to a particular hardware grouping if the hardware grouping includes a significant number of server racks configured exclusively for use of one or more data storage volumes and these server racks have significant available capacity to enable provisioning of one or more data storage volumes. Alternatively, lower scores may be assigned if there are few server racks in the hardware grouping configured for use of data storage volumes. The score may further be based at least in part on the available storage capacity within a data center room wherein the particular hardware grouping may be located as well as the available storage capacity within the data center, which may include the data center room.

At any time, a virtual computer system service may receive 612, through an interface associated with the virtual computer system service, a request to instantiate one or more virtual machine images into one or more virtual machine instances. The request may be received from a customer of the computing resource service provider through the interface. The customer may specify, within the request, the particular instance type that is to be utilized (e.g., instance size, as defined by the number of RAUs that are to be allocated). However, the request may not include any information regarding any data storage volumes that are to be associated with these one or more virtual machine instances. For instance, the customer may specify, through the interface, that he/she has not provisioned any data storage volumes but may do so at a later time. Alternatively, a customer may specify, within the request, that one or more data storage volumes are to be provisioned in conjunction with the instantiation of the one or more virtual machine images.

In an embodiment, the management sub-system of the virtual computer system service may obtain, from the block-level data storage service, the mapping of the hardware groupings to select 614 a hardware grouping which may be used to instantiate the one or more virtual machine images to fulfill the customer's request. Additionally, the virtual computer system service may obtain other scores from other services that may be related to these particular hardware groupings. For example, in addition to the hardware grouping scores specified within the mapping from the block-level data storage service, the virtual computer system service may obtain a licensing score (e.g., score based at least in part on ability to obtain license for instantiation of the virtual machine image within a particular hardware grouping) and aggregate these scores to select 614 the hardware grouping. Based at least in part on the mapping and any other obtained scores, the virtual computer system service may select the hardware grouping and instantiate 616 the one or more virtual machine images within one or more server racks in the selected hardware grouping. This may increase the likelihood that one or more data storage volumes may be provisioned utilizing one or more server racks within the same hardware grouping as the one or more virtual machine instances.

Figure 7:
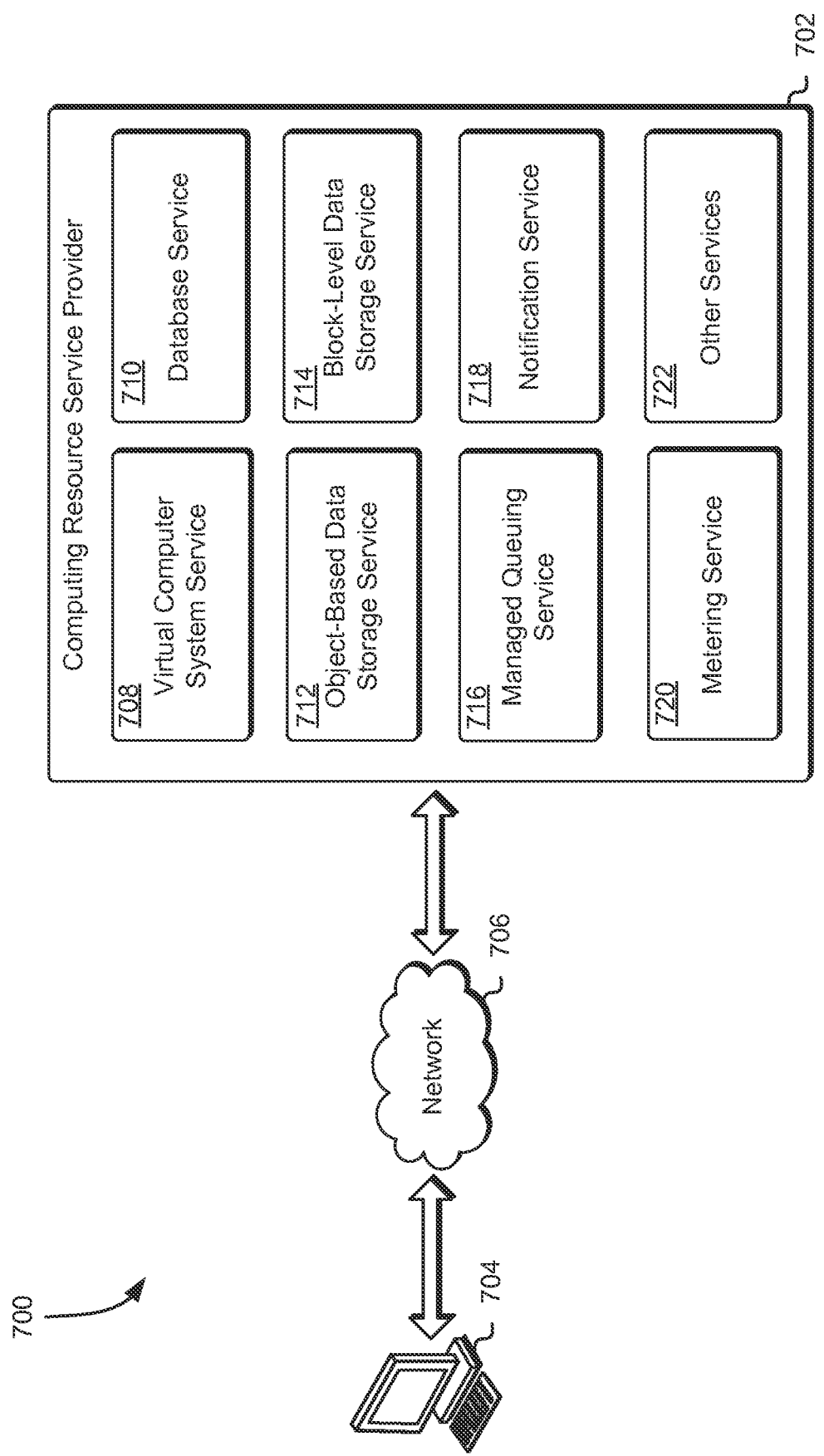
FIG. 7 shows an illustrative example of an environment in which various embodiments can be implemented.

FIG. 7 shows an illustrative example of an environment 700 in which various embodiments can be implemented. In the environment 700, a computing resource service provider 702 may provide a variety of services to a customer 704 or other users. The customer 704 may be an organization that may utilize the various services provided by the computing resource service provider 702 to remotely provision and maintain one or more resources and define a level of access for users of his or her resources. As illustrated in FIG. 7, the customer 704 may communicate with the computing resource service provider 702 through one or more communications networks 706, such as the Internet. Some communications from the customer 704 to the computing resource service provider 702 may cause the computing resource service provider 702 to operate in accordance with various techniques described herein or variations thereof.

As noted above, a computing resource service provider 702 may provide various computing resource services to its customers. For instance, in this particular illustrative example, the computing resource service provider 702 provides at least seven types of services. The services provided by the computing resource service provider, in this example, include a virtual computer system service 708, a database service 710, an object-based data storage service 712, a block-level data storage service 714, a managed queuing service 716, a notification service 718, a metering service 720 and one or more other services 722, although not all embodiments of the present disclosure will include all such services and additional services may be provided in addition to or as an alternative to services explicitly described herein.

The virtual computer system service 708 may be a collection of computing resources configured to instantiate virtual machine instances onto virtual computer systems on behalf of the customers 704 of the computing resource service provider 702. Customers 704 of the computing resource service provider 702 may interact with the virtual computer system service 708 to provision and operate virtual computer systems that are instantiated on physical computing devices hosted (e.g., physical hosts) and operated by the computing resource service provider 702. The virtual computer systems may be used for various purposes, such as to operate as servers supporting a website. Other applications for the virtual computer systems may be to support database applications, electronic commerce applications, business applications and/or other applications.

In an embodiment, the virtual computer system service 708 is configured to obtain physical network information to identify one or more hardware groupings for instantiation of these virtual computer systems. These one or more hardware groupings may be defined narrowly to only include a particular server rack grouping, which may include one or more server racks connected to each other in the network through an aggregation router. Alternatively, the hardware grouping may be defined more broadly to include a data center room, a data center, a data region comprising various data centers and the like. Each hardware grouping may be assigned a score based at least in part on various factors. For instance, a higher score may be assigned to a hardware grouping that includes a significant number of server racks configured to enable provisioning of one or more data storage volumes and that include sufficient available capacity for such provisioning. Based at least in part on these assigned scores, the virtual computer system service 708 may select a particular hardware grouping and instantiate these virtual computer systems.

The database service 710 may be a collection of computing resources that collectively operate to run one or more databases for one or more customers 704. Customers 704 of the computing resource service provider 702 may operate and manage a database from the database service 710 by utilizing appropriately configured API calls. This, in turn, may allow a customer 704 to maintain and potentially scale the operations in the database.

The object-based data storage service 712 may comprise a collection of computing resources that collectively operate to store data for a customer 704. The data stored in the data storage service 712 may be organized into data objects. The data objects may have arbitrary sizes except, perhaps, for certain constraints on size. Thus, the object-based data storage service 712 may store numerous data objects of varying sizes. The object-based data storage service 712 may operate as a key value store that associates data objects with identifiers of the data objects which may be used by the customer to retrieve or perform other operations in connection with the data objects stored by the object-based data storage service 712. Access to the object-based data storage service 712 may be through appropriately configured API calls.

The block-level data storage service 714 may comprise a collection of computing resources that collectively operate to store data for a customer. For instance, the block-level data storage system may be configured to provide block-level data storage volumes for use with a virtual machine instance, as noted above. A customer may interact with the block-level data storage service 714 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

In an embodiment, the block-level data storage service 714 is configured to provision one or more data storage volumes that are to be associated with one or more virtual machine images utilizing the narrowest hardware grouping possible. For instance, the block-level data storage service 714 may initially select the server rack grouping wherein the associated one or more virtual machine instances are stored to determine whether there is sufficient available capacity for provisioning of the one or more data storage volumes. If there is insufficient capacity available, the block-level data storage service 714 may broaden the hardware grouping to the next hierarchical physical network grouping (e.g., data center room, data center, data region, etc.). The block-level data storage service 714 may again attempt to identify any available capacity within these broader hardware groupings until such capacity is found. Alternatively, the block-level data storage service 714 may deny the request if a constraint on the hardware grouping has been reached (e.g., data storage volumes must be within the same data center room as the virtual machine instances, etc.).

The managed queuing service 716 may be a collection of computing resources configured to enable customers 704 to store one or more messages in queues for use by one or more services provided by the computing resource service provider 702. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 718 may be a collection of computing resources configured to enable customers 704 to send and receive notifications through a communications network 706. A customer 704 may utilize an interface, provided by the computing resource service provider 702, to create or subscribe to one or more subjects to which one or more messages may be published. For instance, a customer 704 may use the interface to create a new subject and subscribe to this subject by specifying that any messages published to the subject may be transmitted to a particular location (e.g., electronic mail address, one or more servers, an existing queue within the managed queuing service 716, etc.). Accordingly, when a customer 704 publishes a message to the subject, the message may be transmitted to each recipient subscribed to the subject.

The metering service 720 may provide a variety of services to enable administrators of the computing resource service provider 702 to determine bandwidth pricing for one or more customers 704 based at least in part on each customer's bandwidth utilization at certain times. The metering service 720 may be configured to obtain raw metering data from a data storage service, such as the object-based data storage service 712 or the block-level data storage service 714 described above, and utilize a map reduce process to aggregate this metering data at a certain level of granularity (e.g., five minute intervals, fifteen minute intervals, etc.). Further, the metering service may be configured to categorize the metering data based at least in part on the network bandwidth flow among the computing resource services provided by the computing resource service provider. For instance, the metering service may categorize the metering data based at least in part on the flow of data through the network (e.g., from the customer 704 to the computing resource service, from the computing resource service to the customer 704, from a computing resource service to another service, etc.). This may enable administrators of the computing resource service provider 702 to identify any customers 704 that may be driving peak bandwidth usage and apportion a cost burden to these customers 704.

Figure 8:
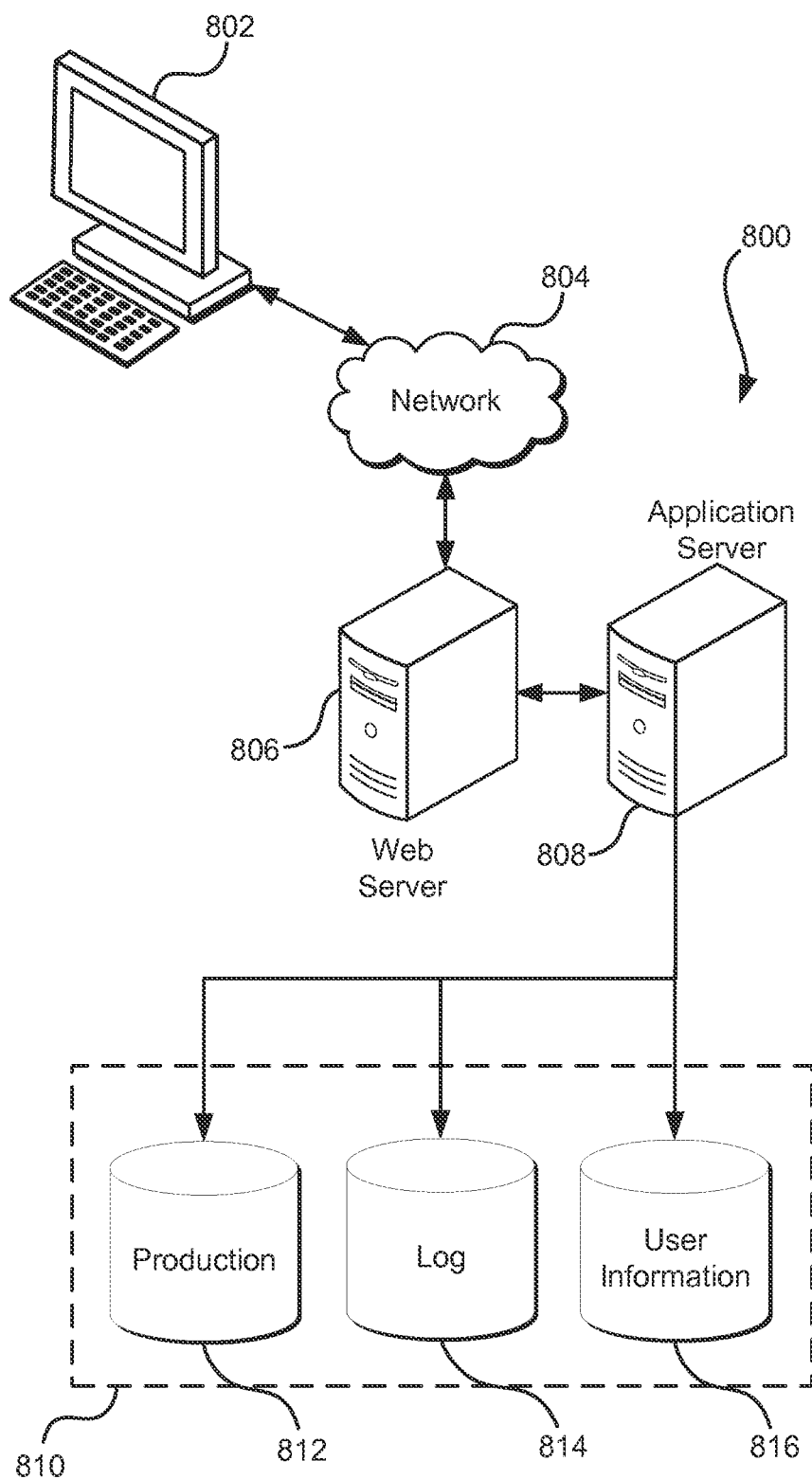
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
for each individual hardware grouping of a plurality of hardware groupings:
obtaining, from a customer of a computing resource service provider, a request to instantiate a computer system;
obtaining information specifying physical characteristics including a physical location of one or more hardware devices of the individual hardware grouping organized by physical network information;
determining available storage capacity within the individual hardware grouping for one or more data storage volumes, the one or more data storage volumes usable to provide storage capacity for the computer system; and
assigning a score to the individual hardware grouping, the score based at least in part on the available storage capacity of the individual hardware grouping;
selecting a particular hardware grouping from among the plurality of hardware groupings based at least in part on:
the score assigned to the particular hardware grouping,
the physical characteristics including the physical location,
a condition based at least in part on the physical network information of the one or more hardware devices of the particular hardware grouping, and
data indicating that the one or more hardware devices of the particular hardware grouping share a matching fate upon an occurrence of a failure of a hardware device of the particular hardware grouping; and
instantiating the computer system to utilize the particular hardware grouping.

2. The computer-implemented method of claim 1, wherein each individual hardware grouping of the plurality of hardware groupings comprises one or more server racks and one or more aggregation routers for enabling communications amongst the one or more server racks, the one or more server racks having a set of hardware devices usable for instantiation of the computer system.

3. The computer-implemented method of claim 1, further comprising providing information from which the particular hardware grouping can be determined to a data storage service thereby causing the data storage service to use the particular hardware grouping to provision one or more data storage volumes within the particular hardware grouping.

4. The computer-implemented method of claim 1, wherein the score assigned to the individual hardware grouping based at least in part on the available storage capacity is determined in a manner that correlates the score with the available storage capacity.

5. A system, comprising at least one computing device that implements one or more services, wherein the one or more services:
obtain a request to provision one or more computing resources, the one or more computing resources usable in association with a further computing resource, the one or more computing resources being a different resource type from the further computing resource;

identify a hardware grouping that includes the further computing resource, the hardware grouping organized by physical network information;
determine availability of capacity for provisioning the one or more requested computing resources within the identified hardware grouping based at least in part on physical characteristics of the hardware grouping, including a physical location of one or more hardware devices of the hardware grouping;
select a hardware grouping to satisfy a condition based at least in part on physical network information of one or more hardware devices of the hardware grouping, the hardware devices of the hardware grouping sharing a matching fate upon occurrence of a failure of a hardware device of the hardware grouping; and
provision the one or more computing resources to utilize the resources of the identified hardware grouping.

6. The system of claim 5, wherein the one or more computing resources are data storage volumes and the further computing resource is a computer system such that the data storage volumes are usable to provide data storage capacity for the computer system.

7. The system of claim 5, wherein the one or more computing resources are computer systems and the further computing resource is a data storage volume such that the computer systems are to be associated with the data storage volume upon provisioning.

8. The system of claim 5, wherein the hardware grouping comprises one or more server racks and one or more aggregation routers for enabling communications amongst the one or more server racks, the one or more server racks having a set of hardware devices usable for provisioning of the one or more computing resources.

9. The system of claim 5, wherein the one or more services are further configured to obtain information specifying storage capacity, network topologies and power source topologies of a computing resource service provider network usable to identify the hardware grouping.

10. The system of claim 5, wherein the one or more services are further configured to cause the one or more computing resources to use the further computing resource upon provisioning of the one or more computing resources within the identified hardware grouping.

11. The system of claim 5, wherein the request further specifies the identified hardware grouping that is to be used to provision the one or more computing resources such that the one or more services are further configured to evaluate the request to identify the hardware grouping.

12. The system of claim 5, wherein the one or more services are further configured to:
evaluate one or more hardware components of the identified hardware grouping to determine the availability of capacity; and
provision the one or more computing resources within one of the one or more hardware components of the identified hardware grouping having available capacity for the one or more computing resources.

13. A non-transitory computer-readable storage medium having stored thereon executable instructions that, as a result of being executed by one or more processors of a computer system, cause the computer system to at least:
in response to a request to provision a first computing resource, obtain information specifying physical characteristics of a network, the network comprising one or more hardware groupings and the physical characteristics including a physical location of one or more hardware devices of the one or more hardware groupings organized by physical network information; and
for each hardware grouping of the one or more hardware groupings:
determine available capacity for a second computing resource based at least in part on the physical characteristics of the respective hardware grouping, including the physical location of one or more hardware devices of the respective hardware grouping, the second computing resource capable of being associated with the first computing resource and being of a different resource type from the first computing resource;
based at least in part on the determined available capacity for each hardware grouping, select a hardware grouping based at least on physical network information of the one or more hardware devices of the hardware grouping, the hardware devices of the hardware grouping sharing a matching fate upon occurrence of a failure of a hardware device of the hardware grouping; and
provision the first computing resource using the hardware devices of the selected hardware grouping.

14. The non-transitory computer-readable storage medium of claim 13, wherein the first computing resource is a data storage volume and the second computing resource is a computer system such that the data storage volume is usable to provide data storage capacity for the computer system.

15. The non-transitory computer-readable storage medium of claim 13, wherein the first computing resource is a computer system and the second computing resource is a data storage volume such that the data storage volume is capable of providing storage capacity for the computer system.

16. The non-transitory computer-readable storage medium of claim 13, wherein the instructions that cause the computer system to determine the available capacity for the second computing resource further include instructions that cause the computer system to:
for each hardware grouping of the one or more hardware groupings:
assign a score to each hardware grouping of the one or more hardware groupings based at least in part on the available capacity; and
utilize the score assigned to each hardware grouping of the one or more hardware groupings to select the hardware grouping.

17. The non-transitory computer-readable storage medium of claim 16, wherein the score assigned to the hardware grouping based at least in part on the available capacity is determined in a manner that correlates the score with the available capacity.

18. The non-transitory computer-readable storage medium of claim 16, wherein the score assigned to the hardware grouping is further based at least in part on a determined number of hardware components within the hardware grouping configured for exclusive use of the second computing resource, available storage capacity within a data center room that includes the hardware grouping, and available storage capacity within a data center that includes the data center room.

19. The non-transitory computer-readable storage medium of claim 13, wherein the instructions further cause the computer system to provide information, from which the selected hardware grouping can be determined, to a computing resource service causing the computing resource service to use the selected hardware grouping to provision the second computing resource within the selected hardware grouping.

20. The non-transitory computer-readable storage medium of claim 13, wherein the hardware grouping comprises one or more server racks and one or more aggregation routers for enabling communications amongst the one or more server racks, the one or more server racks having a set of hardware devices usable for provisioning of the one or more hardware groupings.

* * * * *